Feb. 5, 1929.
T. G. WALDIE
1,700,915
FACSIMILE TELEGRAPHY
Filed Feb. 25, 1925
8 Sheets-Sheet 1
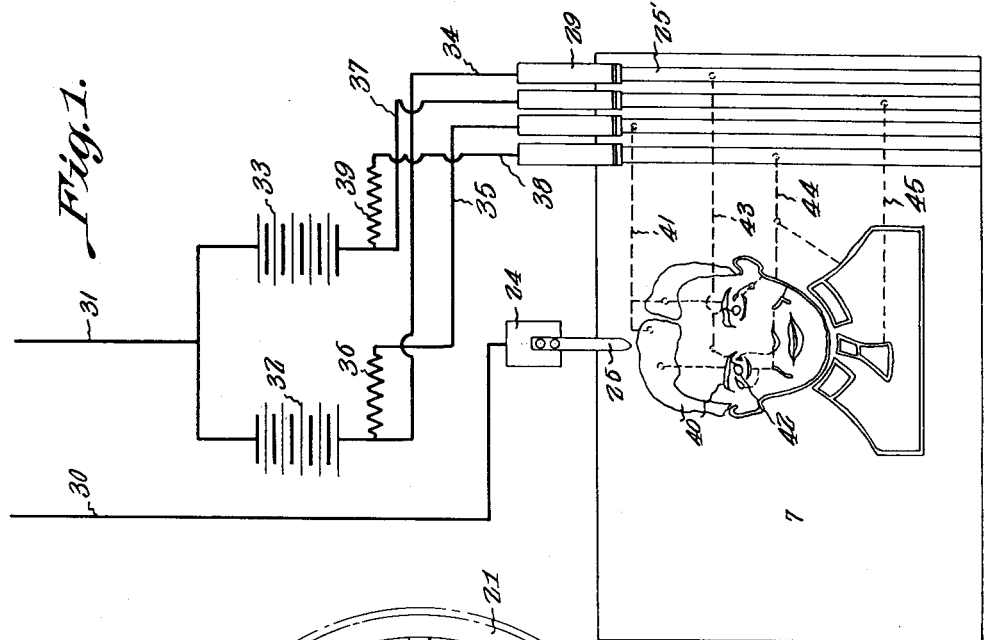
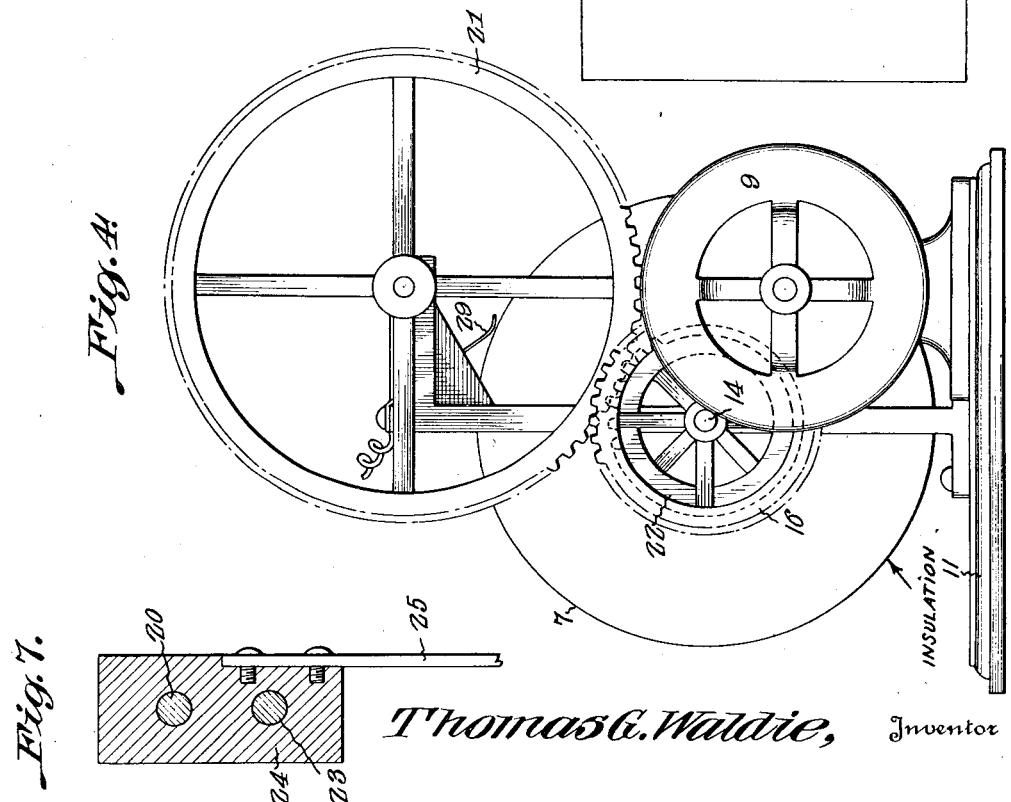
Thomas G. Waldie, Inventor
Witnesses
C. C. Struschman Jr.
By Richard B. Oliver,
Attorney Feb. 5, 1929.
T. G. WALDIE
1,700,915
FACSIMILE TELEGRAPHY
Filed Feb. 25, 1925
8 Sheets-Sheet 2
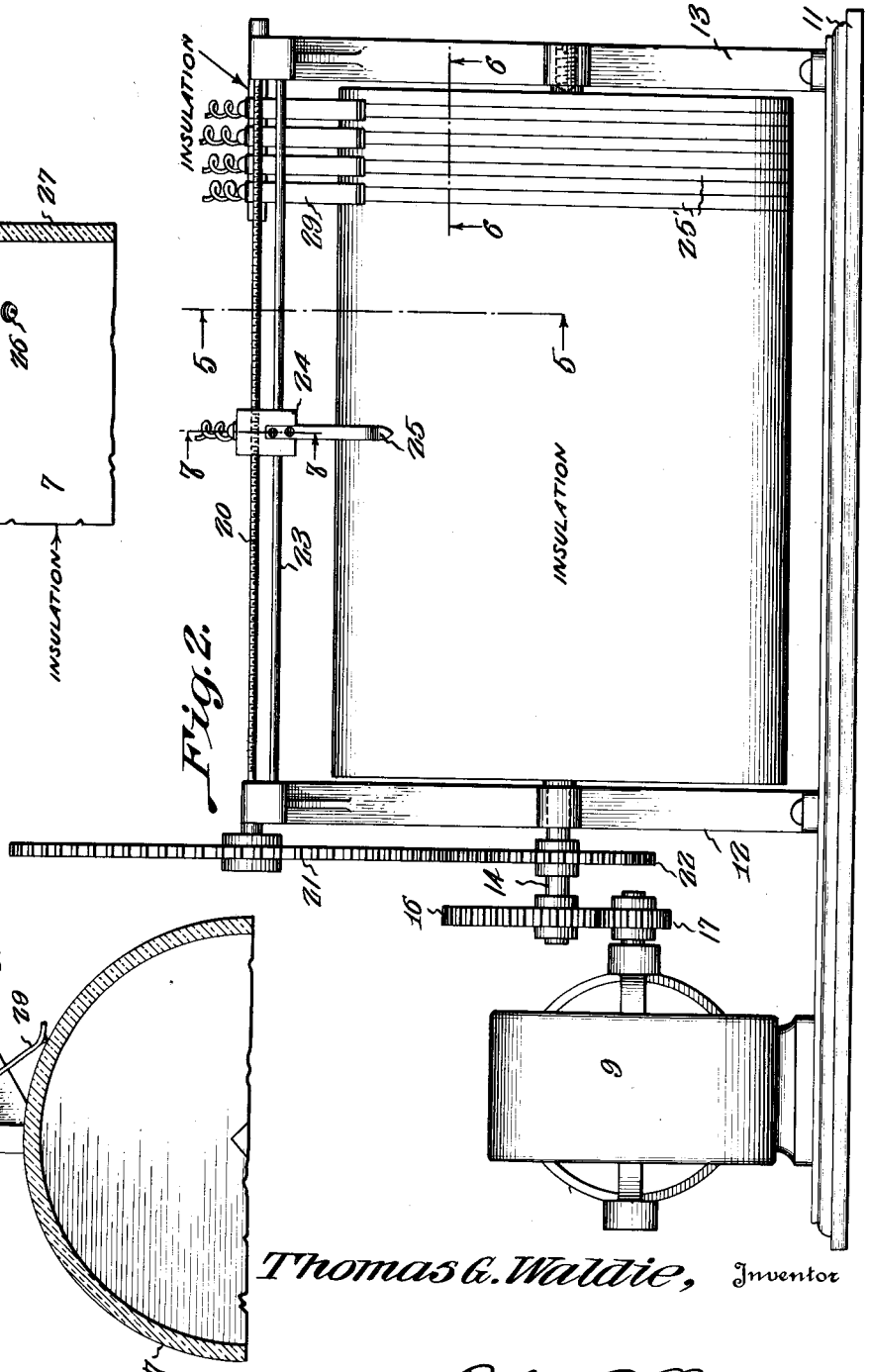
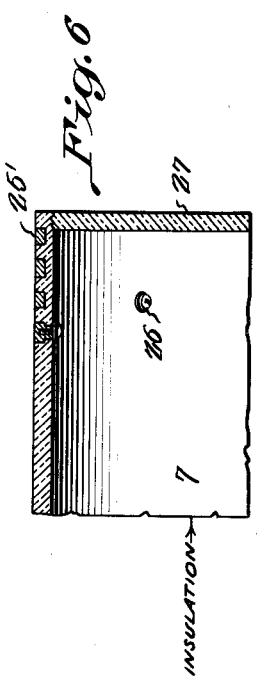
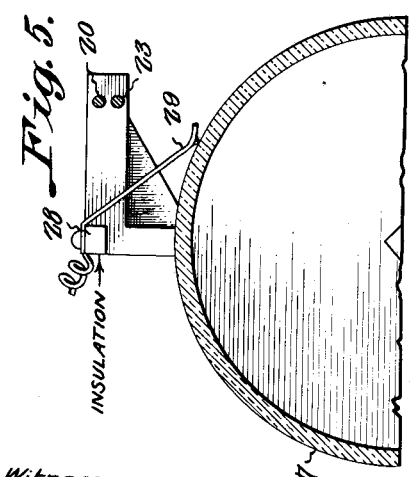
Thomas G. Waldie, Inventor

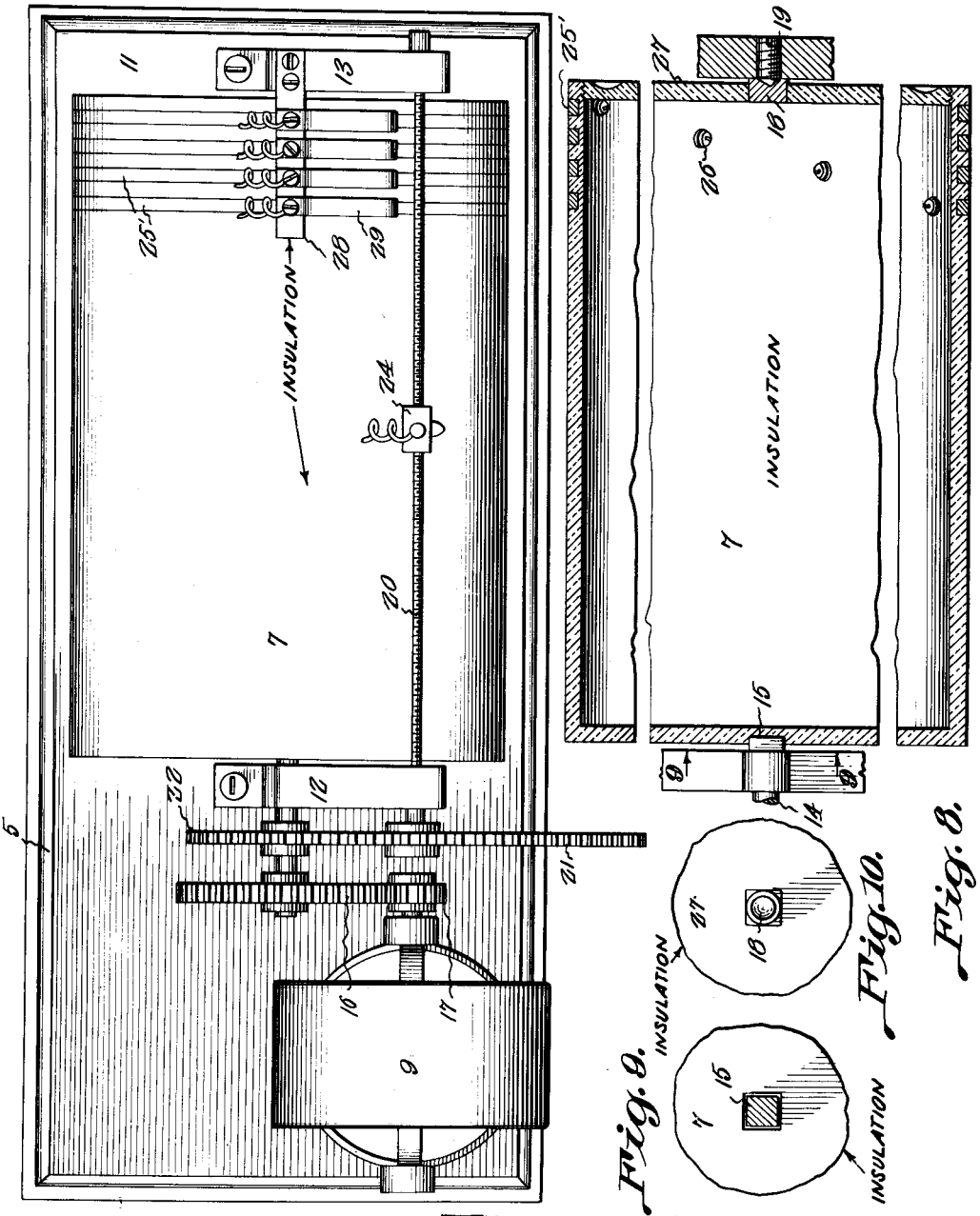

Feb. 5, 1929.
T. G. WALDIE
1,700,915
FACSIMILE TELEGRAPHY
Filed Feb. 25, 1925
8 Sheets-Sheet 4
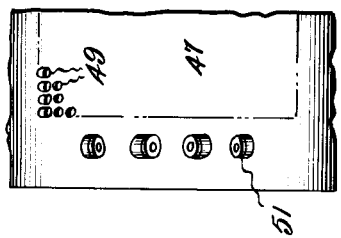
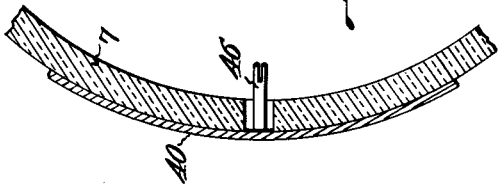
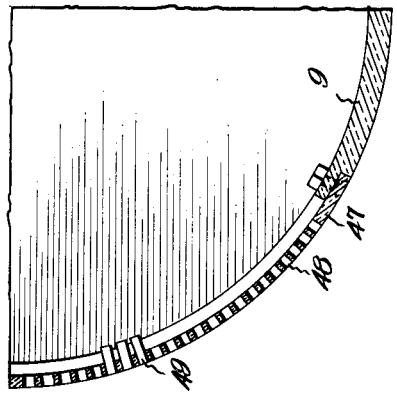
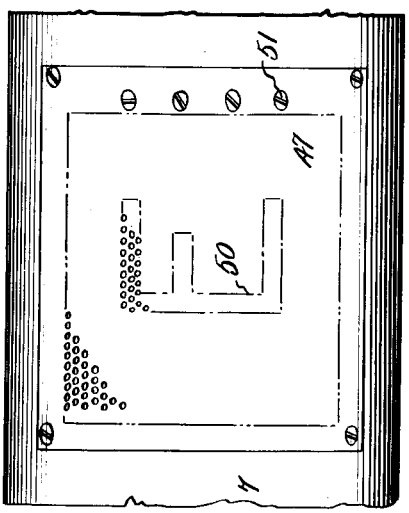
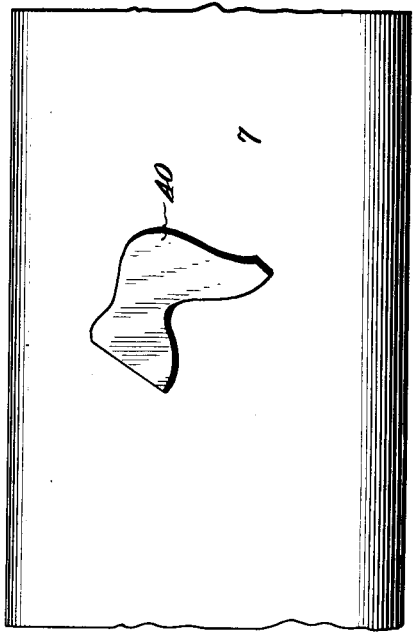
Thomas G. Waldie, Inventor
By Richard B. Owen,
Attorney

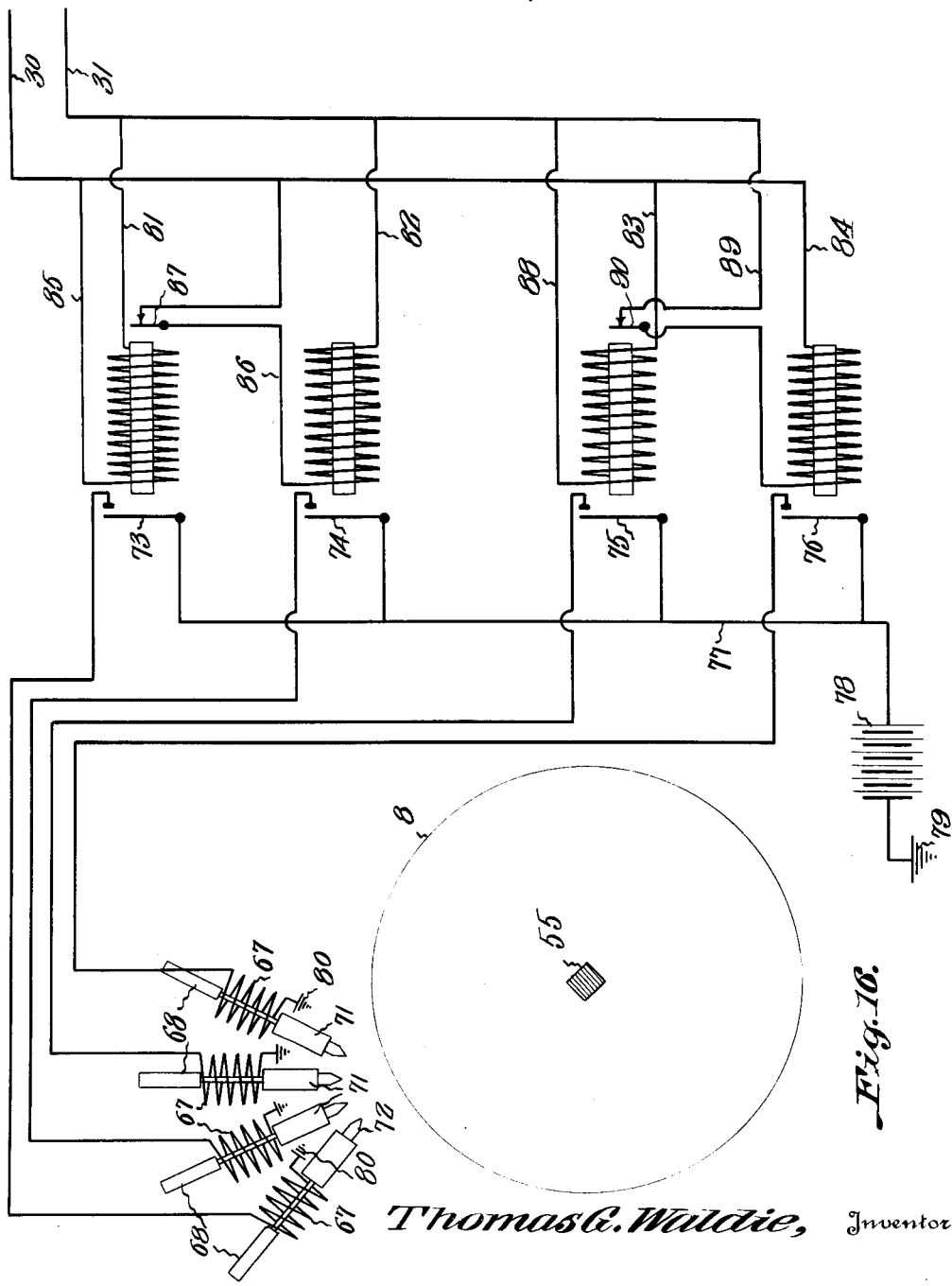

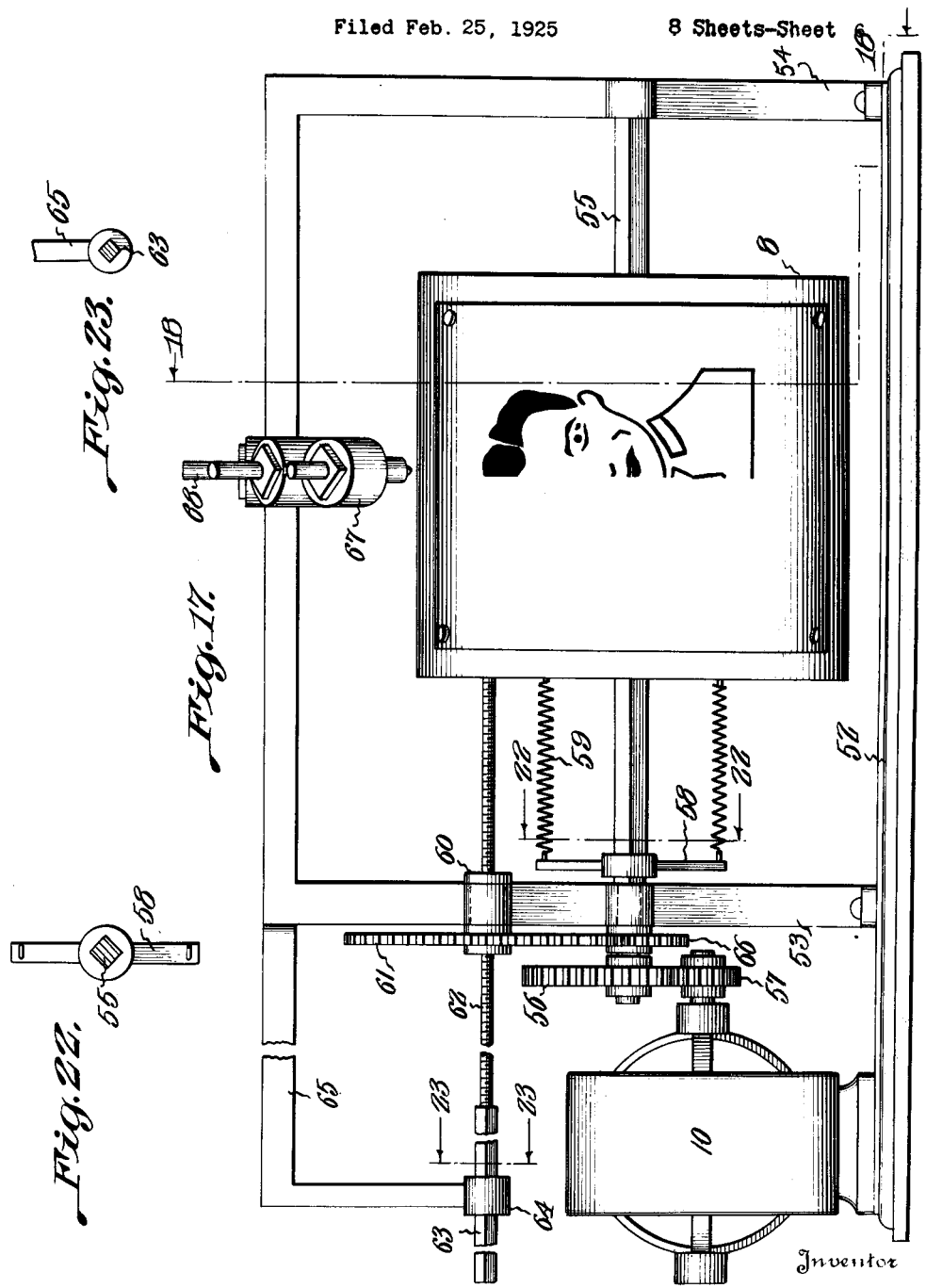

Feb. 5, 1929.　　　　T. G. WALDIE　　　　1,700,915
FACSIMILE TELEGRAPHY
Filed Feb. 25, 1925　　　8 Sheets-Sheet 7
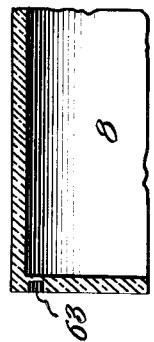
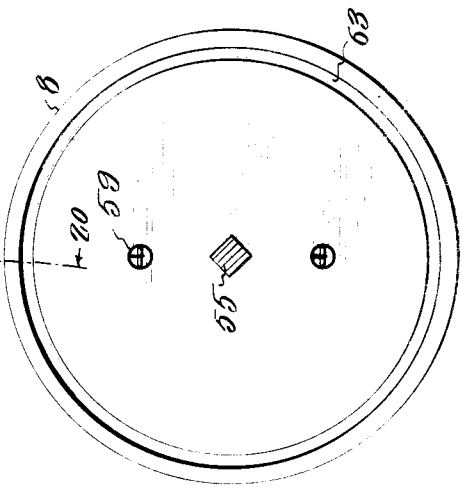
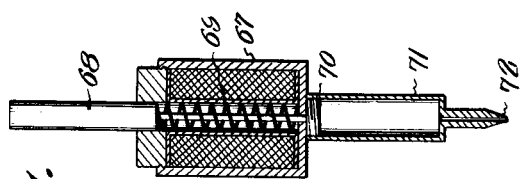
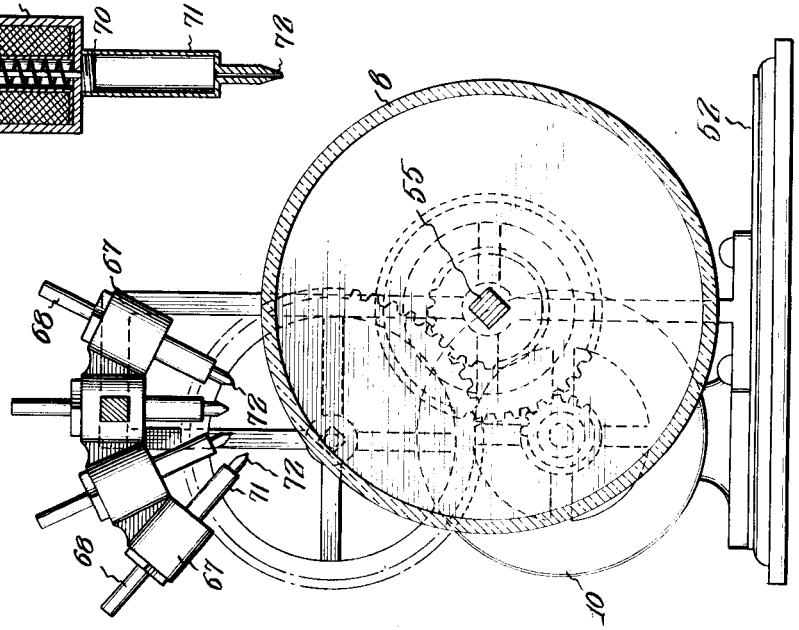
Thomas G. Waldie, Inventor Thomas G. Waldie, Inventor Patented Feb. 5, 1929.

1,700,915

UNITED STATES PATENT OFFICE.

THOMAS G. WALDIE, OF BEVERLY, MASSACHUSETTS.

FACSIMILE TELEGRAPHY.

Application filed February 25, 1925. Serial No. 11,540.

This invention appertains to facsimile telegraphy and has more particular reference to an improved method of and apparatus for the transmission of images by telegraph in a desired color or desired colors.

The primary object of the invention is to provide a method and apparatus of the above kind by means of which the desired results may be obtained at a minimum expense and in an accurate manner so as to be thoroughly practical.

A further object of the invention is to provide, in an apparatus of the above kind, means controlled by the image to be transmitted to send out electrical impulses, and improved means to selectively vary the value of said impulses.

Another object of the invention is to provide in an apparatus of the above kind, a plurality of normally inoperative markers to make marks of different colors, and improve means operable by electrical impulses to render each marker operative, each of said last named means requiring impulses of different values to operate the same, whereby an image may be recorded visually in a desired selected color, or whereby different portions of the image may be recorded in selected different colors.

Still another object of the invention is to provide, in an apparatus of the above kind wherein means controlled by the image to be transmitted is provided to send out electrical impulses, means whereby the impulses transmitting the portions of an image of one color may be varied in value from impulses transmitting portions of the image of another color.

Still another object of the invention is to construct the image to be transmitted so that it may be readily properly associated with the electrical impulse sending means whereby, when a contact finger is caused to traverse the various portions of such image, the electrical impulses which are sent out will be varied as to value in accordance with the colors of the various image portions.

With the above general objects in view, and others that will become apparent as the nature of the invention is better understood, the same consists in the novel method and in the novel form, combination and arrangement of parts of the apparatus hereinafter more fully described, shown in the accompanying drawings and claimed.

In the drawings, wherein like reference characters indicate like corresponding parts throughout the several views, Figure 1 is a diagrammatic plan view of elements employed at the sending station,

Figure 2 is a front elevational view of the sending machine,

Figure 3 is a top plan view of the machine shown in Figure 2,

Figure 4 is an end elevational view of the device shown in Figure 3,

Figure 5 is a fragmentary sectional view taken substantially upon line 5—5 of Figure 2, Figure 6 is a view similar to Figure 5 taken on the line 6—6 of Figure 2, Figure 7 is a fragmentary sectional view taken on the line 7—7 of Figure 2, Figure 8 is a fragmentary central longitudinal sectional view of the drum and adjacent parts of the sending machine, partly broken away, Figure 9 is a fragmentary sectional view taken on the line 9—9 of Figure 8, Figure 10 is a view similar to Figure 9 looking at the opposite end of the drum of the sending machine, Figure 11 is a fragmentary elevational view of the drum of the sending machine and illustrating one manner of providing an image thereon, Figure 12 is a sectional view of the device shown in Figure 11, Figure 13 is a view similar to Figure 11 illustrating a modified form of the invention,

Figure 14 is a sectional view of the device shown in Figure 13,

Figure 15 is an inside view of an end portion of the cylinder shown in Figure 13, Figure 16 is a view similar to Figure 1 of elements provided at the receiving station, Figure 17 is a front elevational view of the receiving machine, Figure 18 is a sectional view taken substantially upon the line 18—18 of Figure 17,

Figure 19 shows the receiving drum in end elevation with its supporting shaft end in section and looking toward the right of Figure 17, Figure 20 is a fragmentary sectional view taken substantially upon line 20—20 of Figure 19, Figure 21 is a central longitudinal sectional view of one of the marking pens forming part of the receiving machine,

Figure 24:
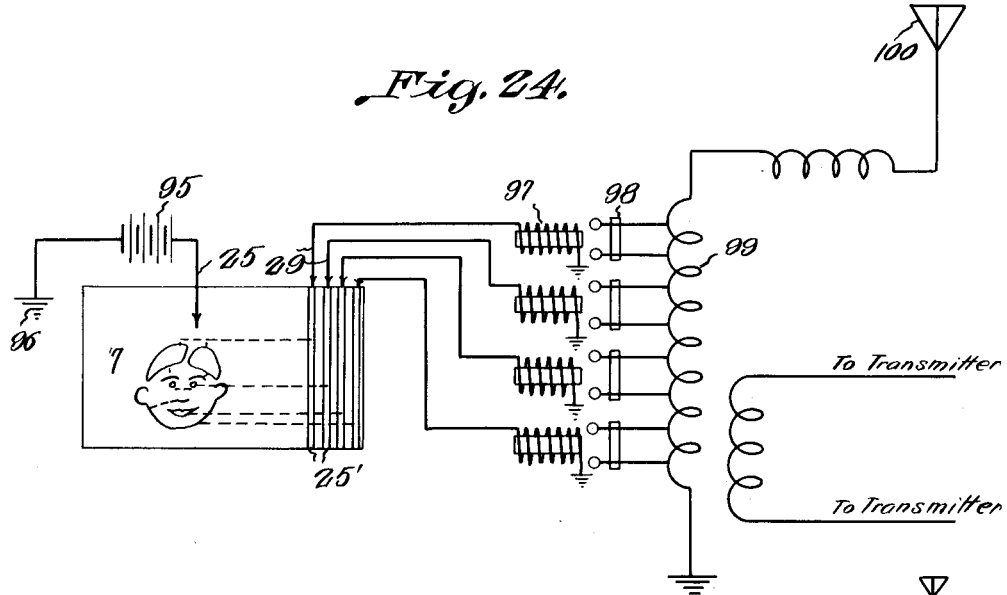
Figure 25:
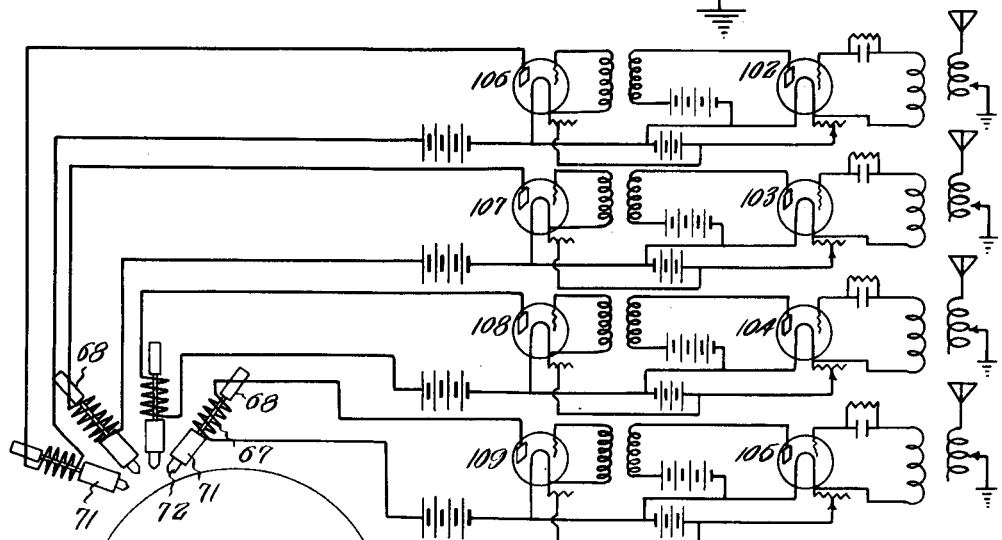

Figure 22 is a sectional view taken substantially upon line 22—22 of Figure 17,

Figure 23 is a sectional view taken substantially upon line 23—23 of Figure 17,

Figure 24 is a view similar to Figure 1 illustrating a modification of the elements at the sending station so as to adapt the invention to wireless or radio telegraphy, and Figure 25 is a view similar to Figure 16 illustrating elements at the receiving station adapted to cooperate with the elements at the sending station shown in Figure 24.

In carrying out the present invention, a sending machine 5 is provided at a suitable sending station while a receiving machine generally indicated at 6 is provided at a suitable receiving station.

The sending machine embodies a cylinder 7, and the receiving machine embodies a cylinder 8, which cylinders are preferably constructed of insulating material as shown and respectively driven by synchronous motors indicated at 9 and 10.

The sending machine may embody a base 11 having a pair of standards 12 and 13 suitably rigidly mounted thereon, the standard 12 having a stub shaft 14 journaled therein. As shown more clearly in Figure 8 the inner end of the stub shaft 14 is of polygonal cross section as indicated at 15 and fits within a similar recess in the adjacent end of the drum 7, the outer end of the shaft 14 having a spur gear 16 fixed thereon in mesh with a pinion 17 upon the armature shaft of the motor 9. The opposite end of the drum 7 is provided with a short spindle 18, the outer end of which has a conical recess in which bears the inner end of a screw 19 threaded through the standard 13. In this way the drum 7 is journaled for rotation upon a horizontal axis and operatively connected with the motor 9, removal of the drum 7 being allowed upon threading of the screw 19 outwardly so as to release the same from the socket of the spindle 18. Such removal of the drum is desirable in substituting one drum for another with previously applied images.

Horizontally disposed above the drum 7 is a feed screw 20 having threads thereon of relatively fine pitch, the ends of the screw 20 being journaled in the upper ends of the standards 12 and 13 and one end of the screw 20 having a relatively large gear 21 secured thereon in mesh with a smaller gear 22 fixed upon the shaft 14. In this manner, when the shaft 14 is driven, the feed screw 20 is rotated for a purpose which will presently become apparent.

Rigidly mounted below the feed screw 20 and parallel to the latter is a guide rod 23 upon which is slidably mounted a block 24 which has a contact finger 25 fixed thereto, the finger 25 being in a depending position with its free lower end arranged to wipe upon the surface of the cylinder 7 when the latter is rotated. The block 24 has an internally threaded bore for reception of the feed screw 20 whereby, when said feed screw is rotated, the block 24 and its finger 25 is slowly fed endwise of the cylinder 7.

The cylinder 7 has a plurality of parallel annular grooves in the outer surface thereof adjacent one end, and seated in these grooves are collector rings 25′ which have separate binding posts 26 exposed in the interior of the drum 7. The adjacent end wall of the cylinder 7 may be removable for access to these binding posts 26, and as shown in Figure 8 the end wall is indicated at 27 and shown as threaded detachably in place.

Secured to the upper end of the standard 13 is a bracket 28 of insulating material to which is secured a plurality of brushes 29, each of which has wiping contact with one of the collector rings 25′.

Referring to Figure 1, 30 and 31 indicate the telegraph line wires, and in accordance with the present invention the wire 30 is electrically connected to the contact finger 25 while the wire 31 is connected to the negative end of a battery 32 and to the positive end of a battery 33. One of the brushes 29 is connected by a lead wire 34 with the positive end of battery 32, while another of said brushes is connected by a wire 35 with the positive end of the battery 32, a suitable resistance 36 being placed in the connection 35 for a purpose which will later become apparent. Still another of the brushes 29 is connected by means of a wire 37 with the negative end of battery 33, and the remaining brush 29 is connected with the negative end of the battery 33 by means of a wire 38 in which is placed a resistance 39.

Suitably provided upon the outer surface of the cylinder 7 is the image to be transmitted. This image is provided in sections of conducting material so that sections of one color are insulated from those of another color, and these image sections are electrically connected to the collector rings 25′. The sections of one color are connected to one collector ring while the sections of another color are connected to a different collector ring and so on. For example, as shown in Figure 1, the sections 40 representing the hair and eyebrows of the image of a person are connected by wire 41 with the collector ring 25′ which is second to the right in Figure 1. On the other hand, the differently colored sections 42 representing the eyes are connected by wires 43 with the collector ring 25′ which is fourth counting from left to right in Figure 1. Other sections of a still different color are connected by wire 44 with the first collector ring counting from left to right in Figure 1 while the remaining collector ring is connected by wire 45 with sections of still a different color.

As shown in Figures 11 and 12, the sections of the image may be formed of pieces of metal foil or other conducting material fastened upon the surface of the cylinder 7 by gluing or the like, each section having an inwardly projecting pin 46 which projects to the interior of the cylinder 7 and is adapted to be connected by a conductor wire to the proper binding post 26 of the proper collector ring 25'. However, this manner of providing the image upon the cylinder 7 is merely illustrated by way of example as the same results may be procured or attained in numerous different ways. As an example of another manner of securing the desired results, a modification of this part of the invention is illustrated in Figures 13 to 15 inclusive. In the latter figures, the cylinder 7 is shown as provided with a relatively large opening in which is secured a panel 47 of insulating material which has numerous closely related apertures 48 therein, such apertures being provided practically throughout the area of the panel. Metallic plugs 49 are adapted to be tightly fitted in the apertures 48 so as to construct the desired image to be transmitted such as the letter E indicated at 50 in Figure 13. The plugs 49 are adapted to be positioned with their outer ends flush with the outer surface of the cylinder as shown in Figure 14, the inner ends of the plugs projecting into the interior of the cylinder 7 and adapted for connection by means of wires with the proper ones of the collector ring binding posts 26. It is apparent that different portions of the image may be connected to different ones of the collector rings in this manner. However, as shown in Figures 13 and 15, the panel 47 is provided with a plurality of binding posts 51 corresponding in number to the number of binding posts 26 or collector rings 25'. By reason of the provision of the binding posts 51 the proper ones of the plugs 49 may be connected by wires to such binding posts 51 so that only one wire is required between each of the binding posts 51 and the binding post 26 to which it is to be connected. In this way the panel 47 can be prepared and later applied to the cylinder after which only four wire connections need be made, thus simplifying the invention and rendering the same more practical.

Referring to Figures 16 to 23 inclusive, the sending machine may embody a suitable base or support 52 upon which is a frame including standards 53 and 54 in which is journaled a horizontal shaft 55, the major intermediate portion of which is of polygonal form in cross section. The drum 8 is slidably mounted for movement longitudinally on the shaft 55 in such manner that when said shaft 55 is rotated rotation of the drum 8 is also had, and upon one end of the shaft 55 is secured a spur gear 56 that meshes with a spur pinion 57 secured upon the armature shaft of the motor 10. Secured upon the shaft 55 adjacent the standard 53 is a cross bar 58 the ends of which are connected to the drum 8 by means of helical tension springs 59 whereby the drum 8 is normally yieldingly held adjacent the standard 53. The hub 60 of a large spur gear 61 is journaled in the bracket or standard 53 above the shaft 55 so as to be held against endwise displacement relative to said standard 53, and a horizontal feed screw 62 has threaded engagement with the hub 60. The inner end of the feed screw 62 bears upon the adjacent end of the drum 8, preferably in an annular groove 63 of the latter as shown in Figures 19 and 20, and the feed screw 62 has a squared outer end portion 63 that slidably engages in a similarly formed bearing 64 provided on the depending arm of an angular bracket 65 carried by the standard 53. Secured on the shaft 55 is a gear 66 that meshes with the gear 61, and it will thus be seen that when the motor 10 is placed into operation the cylinder 8 will be turned and will also be slowly fed endwise by means of the feed screw 62.

Rigidly mounted above the drum 8 are a plurality of solenoids 67 whose longitudinal axes are radial to a common point upon the surface of the drum 8, and these solenoids include cores 68 which are normally elevated by means of springs 69, the lower ends of the cores 68 having detachable connection as at 70 with an ink reservoir 71 having a scribing stylus 72 upon the lower end thereof. The reservoir 71 and stylus 72 constitutes a detachable pen and it is obvious that inks of different colors are placed within the reservoirs of the detachable pens.

A plurality of polarized relays 73, 74, 75 and 76 are provided at the receiving station as indicated in Figure 16, and the number of relays corresponds with the number of pens employed at the receiving station, the latter also corresponding in number to the number of collector rings and brushes employed with the sending apparatus. Each relay controls a separate circuit to one of the solenoids 67, and the solenoid circuits have a common feed line 77 associated with the positive end of a battery 78 whose negative end is grounded as at 79, the solenoids 67 being also grounded as at 80.

The line wire 31 is connected by wire 81 with the outer end of the coil of relay 73, and by wire 82 with the corresponding end of the coil of relay 74, while the similar end of the coil of relay 75 is connected by wire 83 with the line wire 30 and the outer end of relay 76 is connected by wire 84 with the line wire 30. The inner ends of the coils of relays 73 and 74 are connected with the line wire 30 by means of wires 85 and 86, and in the wire 86 is a break contact 87 operatively associated with the outer end of the core of relay 73. In a like manner, the inner ends of the coils of relays 75 and 76 are connected by wires 88 and 89 with the line wire 30 while the wire 89 has a break contact 90 operatively associated with the outer end of the core of relay 75. The relays 73 and 75 are fast-operating relays while the relays 74 and 76 are slow-operating relays, and it will thus be seen that the several relays require distinctive impulses or electrical impulses of different values for their operation. This will become more readily apparent upon the explanation of the operation of the apparatus to be later set forth.

The operation of the apparatus is substantially as follows:—

With the representation of the image upon the cylinder 7 as shown in Figure 1 the motors 9 and 10 are simultaneously placed into operation, the motor 9 rotating the cylinder 7 and causing slow movement of the contact finger 25 endwise of the cylinder 7 so that said contact finger traverses the entire image. As the contact finger 25 traverses the image the same is reproduced by the pens upon the paper shown as secured upon the drum 8 of the receiving machine in Figure 17, the motor 10 giving corresponding rotation and endwise movement to the cylinder 8 through the medium of the feed screw 62 and square shaft 55 together with the gearing above described.

The general operation thus far outlined is old and generally well known in the art of facsimile telegraphy. As the contact finger 25 passes over the portions 40 which are connected to the slip ring which is second reading from left to right in Figure 1, the current will flow from battery 32 through the resistance 36, wire 35, the brush to which said wire 35 is connected, the portions 40 connected by wire 41 to the slip ring with which this brush cooperates, the contact finger 25 to the line wire 30. By reason of the fact that the current passes through the resistance 36, the impulses sent over the line wire 30 will be comparatively weak and of the proper value to actuate the relay 74 whose feed wire 86 is connected to the line wire 30, the current being too weak to actuate the relay 73 which is the only other relay connected to the line wire 30 at its feed side. The operation of the relay 74 closes a circuit in which is included the solenoid 67 of the pen shown in Figure 15 which is second, reading from left to right. By previous arrangement with the sending station, the ink contained by the pen carried by this solenoid is of the same color as that of the image portions 40, and these portions will be reproduced in the desired color. When the contact finger 25 traverses portions of the image which are connected to the collector ring 25' which is fourth, reading from left to right in Figure 1, the current will flow from battery 32 through wire 34, to and through the contact finger 25 to line wire 30. This current does not pass through any resistance and will be sufficiently strong to actuate relay 73 which opens the break contact 87 and prevents operation of relay 74. The operation of relay 73 closes a circuit to the solenoid 67 of the first pen, reading from left to right in Figure 16, and this pen reproduces these portions of the image in the desired color, the pen now in operation containing ink of the color of the portions of the image which are being reproduced. When the finger 25 engages portions of the image which are connected to the collector ring which is first, reading from left to right in Figure 1, the current will flow from battery 33 to line wire 31, through wire 89, the coil of the relay 76, the wire 84 and line wire 30 to the contact 25. The current then passes from contact wire 25 to the brush 29, wire 38 and resistance 39 back to the battery 33. The relay 76 is adapted to be operated by a relatively weak current passing thereto over the line wire 31, and as the current now fed thereto is weak by reason of passing through the resistance 39, its operation is insured, the relay 75 not operating at this time as the latter requires current of relatively stronger character. The operation of the relay 76 effects closing of a circuit including the solenoid 67 of the pen which is fourth reading from left to right in Figure 16. In this manner the portions of the image which are electrically connected to the collector ring associated with the wire 38 are reproduced in their proper color, such color of ink being previously placed in the pen thus actuated. When the contact finger 25 traverses portions of the image connected to the collector ring which is third, reading from left to right, in Figure 1, the current flows from battery 33 through line wire 31, wire 88, the coil of the relay 75, wire 83, through line wire 30 to contact finger 25 and then back to the collector ring mentioned from whence it passes through wire 34 back to the battery 33. As the current does not pass through a resistance at this time, it will be relatively strong so as to actuate relay 75 and open the break contact 30 for preventing operation of relay 76. When the relay 75 is actuated the same closes a circuit including the solenoid 67 of the pen which is third, reading from left to right in Figure 16, so as to bring the pen associated with the coil of this solenoid into engagement with the sheet upon the drum 8 so as to reproduce these portions of the image in their proper color which has been previously placed in the reservoir of this pen. It will be apparent that, as the pens are constructed as shown clearly in Figure 21, said pens will be lowered into engagement with the sheet upon the cylinder 8 when said solenoids are energized, while the pens will be elevated to an inoperative position as shown in Figures 16 and 18 by the springs 69 when the sc⁷⁻ noids 67 are not energized.

It will thus be seen that I have pro a simple and affective apparatus for mitting images in any desired colors. ever, if it is desired to only reprodu image in a single color, this may be affected by connecting all portions of the image to only one of the collector rings, the particular collector ring to which the image portions are connected depending upon the color in which the image is to be reproduced. This is true as the color of the ink in the pen which is in operative relation to the particular collector ring utilized will be known to the operator of the sending machine. If it is desired to reproduce images in more than four colors, this may be arranged for by using additional pens, associating additional collector rings and brushes with the drum 8, and associating these additional brushes with additional batteries having different forms of resistance which also differ from the resistances 36 and 39, and associating with these additional pens, polarized relays adapted to operate upon the supply of still different values of current impulses thereto. In other words, provision is made to supply current impulses of different values to the relays utilized for placing the additional pens in operation, the values of the current supplied for the actuation of these additional relays being different from the values of the relays shown. Obviously, the use of alternating current can be resorted to for actuating the additional relays.

Instead of using the telegraph line for the systems as outlined above, radio transmission may be used as illustrated in Figures 24 and 25. In the embodiment of the invention shown in Figures 24 and 25, the drums are actuated in the same manner as outlined in connection with the form of the invention as already described, and this is also true in respect to the pens associated with the cylinder 8 and the contact finger 25 associated with the drum 7. However, in this embodiment of the invention the contact finger 25 is connected to a battery 95 which has one terminal thereof grounded as at 96, while the brushes 29 are electrically connected with magnets 97 that are operatively associated with short circuiting devices 98 for the inductance 99 of a radio sending device. As shown in Figure 24, each brush is connected to a separate magnet 97, and each magnet effects short circuiting of a different portion of the inductance 99 which is operatively related in a well known manner with an antenna 100 and a ground connection 101. The inductance 99 forms part of a radio transmitter, and as shown in Figure 25, each solenoid 67 is associated with a separate receiving set. These receiving sets are broadly designated at 102, 103, 104, and 105, and they include amplifiers 106, 107, 108 and 109 respectively. These amplifiers are provided so that the waves which are picked up by the various receiving sets will be amplified so as to effect the actuation of the solenoids 67 for rendering them operative. The actuation of one of the magnets 97 affects short circuiting of the inductance 99 so that when the radio transmitter is then operated, waves of a predetermined length will be sent out. The receiving set 102 will be previously tuned so as to receive waves of this predetermined length. In a like manner, the second magnet 97, reading from top to bottom, will short circuit the inductance 99 so as to insure sending of waves of still another length for which the receiving set 103 is tuned, and so on with regard to the remaining magnets 37 and radio sets 104 and 105. It will thus be seen, that the sending apparatus shown in Figure 24, as is the case with the apparatus shown in Figure 1, provides means for sending out current impulses of different values representative of image portions of corresponding different colors, while receiving means are provided which are operable by current impulses of corresponding values, each receiving means being operable by or requiring for its operation current impulses of a predetermined value which is different from the value of the current necessary to operate each of the remaining receiving means. Thus independent actuation of the pens is insured. Obviously, the various portions of the image are selectively connected to the slip rings 25 in Figure 24 so that the desired and proper pens will be actuated for reproducing the image in the desired or proper predetermined colors with the apparatus shown in Figure 25.

From the foregoing description it is believed that the construction and operation as well as the advantages of the apparatus and method will be readily understood and appreciated by those skilled in the art.

Minor changes may be made without departing from the spirit and scope of the invention as claimed.

What I claim as new is:—

1. An apparatus for facsimile telegraphy including a movable member adapted to receive the image to be transmitted with the image constructed of current conducting material, a plurality of current collecting elements movable with the movable member, a current collecting brush associated with each current collecting element, a contact finger associated with said movable member, means to cause relative movement between the contact finger and the movable member for affecting traversing of the image by said contact finger, means to permit electrical connection of the image with a desired one of said current collecting elements, means for supplying currents of different values to said current collecting brushes, a plurality of normally inoperative markers to make marks of different colors, a second movable member adapted to have the image scribed thereon, means to effect relative movement between the markers and the second movable member whereby the image may be recorded on the latter, and means associated with each marker to render the same operative, each of last named means requiring electrical impulses of a different one of said values for its actuation, whereby the image may be recorded by a predetermined one of said markers.

2. An apparatus for facsimile telegraphy including a movable member adapted to receive the image to be transmitted with the differently colored portions of the image constructed of insulated sections of current conducting material, a plurality of current collecting elements movable with the movable member, a current collecting brush associated with each current collecting element, a contact finger associated with said movable member, means to cause relative movement between the contact finger and the movable member for effecting traversing of the image by said contact finger, means to permit electrical connection of the differently colored portions of the image with predetermined different ones of said current collecting elements, means for supplying currents of different values to said current collecting brushes, a plurality of normally inoperative markers to make marks of different colors, a second movable member adapted to have the image scribed thereon, means to cause relative movement between the markers and the second movable member, whereby the image may be recorded on the latter by said markers, and means associated with each marker to render the same operative, each of said last named means requiring electrical impulses of a different one of said values for its actuation, whereby the differently colored portions of the image may be recorded by a predetermined different one of said markers.

3. In a sending machine for facsimile telegraph apparatus, a movable member, means to facilitate application of an image to said movable member with differently colored portions of the image insulated from each other and adapted to conduct electricity, a plurality of current collecting elements movable with said movable member, means to permit connection of the differently colored portions of the image with predetermined different ones of said current collecting elements, current collecting brushes operatively associated with said current collecting elements, and a contact finger for traversing the portions of the image.

4. In a sending machine for facsimile telegraph apparatus, a movable member, means to facilitate application of an image to said movable member with differently colored portions of the image insulated from each other and adapted to conduct electricity, a plurality of current collecting elements movable with said movable member, means to permit connection of the differently colored portions of the image with predetermined different ones of said current collecting elements, current collecting brushes operatively associated with said current collecting elements, and a contact finger for traversing the portions of the image, and means for supplying electrical currents of different values to said current collecting brushes.

5. In a sending machine for facsimile telegraph apparatus, a plurality of markers for making marks of different colors, means to normally render said markers inoperative, solenoids operable to render said marker operative, and means including a polarized relay associated with each solenoid for rendering said solenoids operative, said relays requiring current impulses of different values for their operation.

6. In an apparatus for facsimile telegraphy, a plurality of units for respectively creating electrical impulses of different electrical characteristics, a single image-traversing contact, a sectional image and means to establish electrical connection of the sections of the image traversed by said contact with respective units.

7. In an apparatus for facsimile telegraphy, a plurality of units for respectively creating electrical impulses of different values, a sectional image having its sections representing respective color values, a single image-traversing contact, and means to facilitate electrical connection of respective sections of the image traversed by said contact, respectively with different units.

8. In an apparatus for facsimile telegraphy, a plurality of units for respectively creating electrical impulses of different electrical characteristics, a sectional image having its sections representing respective color values, a single image-traversing contact, and means to establish electrical connection of respective sections of the image traversed by said contact, respectively with different units, a plurality of normally inoperative markers to make marks of different colors, and means associated with each marker to render the same operative, each of said last named means requiring electrical impulses of a different electrical characteristic for its actuation, whereby the differently colored portions of the image may be recorded by a predetermined different one of said markers.

9. An apparatus for facsimile telegraphy including a movable member adapted to receive the image to be transmitted, a sectional image on said member arranged with the respective sections of the image representing different color values and constructed of insulated sections of current conducting material, a contact finger associated with said movable member for engagement with the image, means to cause relative movement between the contact finger and the movable member for effecting traversing of the image by said contact finger, means for supplying currents of different electrical characteristics, means to effect electrical connection of the respective sections of the image with predetermined current supplying means.

10. An apparatus for facsimile telegraphy including a movable member adapted to receive the image to be transmitted, a sectional image arranged with respective sections representing different color values of the image constructed of insulated sections of current conducting material, a contact finger associated with said movable member for engagement with the image, means to cause relative movement between the contact finger and the movable member, means for supplying currents of different electrical characteristics, means to effect electrical connection of the respective sections of the image with predetermined current supplying means, a plurality of normally inoperative markers to make marks of different colors, and means associated with each marker to render the same operative, each of said last named means requiring electrical impulses of a respective electrical characteristic for its actuation, whereby respective sections of the image are recorded by respective markers.

In testimony whereof I affix my signature.

THOMAS G. WALDIE.